US008811495B1

(12) United States Patent
Wen

(10) Patent No.: US 8,811,495 B1
(45) Date of Patent: *Aug. 19, 2014

(54) SKIPPED VIDEO DATA RECOVERY USING MULTIPLE ALTERNATIVE RECOVERY MODES

(75) Inventor: Jiangtao Wen, La Jolla, CA (US)

(73) Assignee: Geo Semiconductor Inc., Santa Clara, CA (US)

( * ) Notice: Subject to any disclaimer, the term of this patent is extended or adjusted under 35 U.S.C. 154(b) by 1621 days.

This patent is subject to a terminal disclaimer.

(21) Appl. No.: 11/671,816

(22) Filed: Feb. 6, 2007

(51) Int. Cl.
*H04N 7/12* (2006.01)
*H04N 11/02* (2006.01)

(52) U.S. Cl.
USPC ............. 375/240.25; 375/240.16; 375/240.27

(58) Field of Classification Search
USPC .............. 375/240.25, 240.16, 240.27, 240.12
See application file for complete search history.

(56) References Cited

U.S. PATENT DOCUMENTS

| | | | | |
|---|---|---|---|---|
| 5,617,144 A * | 4/1997 | Lee | ........................... | 375/240.16 |
| 6,594,790 B1 * | 7/2003 | Sato et al. | ..................... | 714/746 |
| 7,773,677 B2 * | 8/2010 | Lee | ........................... | 375/240.27 |
| 8,018,998 B2 * | 9/2011 | Li et al. | ..................... | 375/240.16 |
| 2002/0006161 A1 * | 1/2002 | Van Der Schaar et al. | ........................ | 375/240.11 |
| 2003/0179216 A1 * | 9/2003 | Blume | ........................... | 345/625 |
| 2006/0039471 A1 * | 2/2006 | Dane et al. | ............... | 375/240.16 |

OTHER PUBLICATIONS

U.S. Appl. No. 11/671,838, Wen.
Li, "Novel Sequential Error-Concealment Techniques Using Orientation Adaptive Interpolation", IEEE 12(10):857-864, 2002.
Zhang, "Video Coding With Optimal Inter/Intra-Mode Switching for Packet Loss Resilience", IEEE Journal on Selected Areas in Communications,18(6):966-976, 2000.
Cote, Optimal Mode Selection and Syncronization for Robust Videocommunication Over Error-Prone Networks, IEEE 18(6)952-965, 2000.
Cote, "Optimal Intra Coding of Blocks for Robust Video Communication Over the Internet", Image Communications, pp. 25-34, Sep. 1999.
Zheng, "Geometric-Structure-Based Error Concealment With Novel Applications in Block-Based Low-Bit-Rate Coding", IEEE Trans. Circuits and Systems for Video Technology, 9(4): 648-665, Jun. 1999.
Wenger, "Using RFC2429 and H.263+ at Low to Medium Bit-Rates for Low-Latency Applications", Packet Video Workshop '99, New York, Apr. 1999.
Wang, "Error Control and Concealment for Video Communication: A Review" Proc. IEEE 1998, 86(5): 974-997, May 1998.

(Continued)

*Primary Examiner* — Zachary A Davis
(74) *Attorney, Agent, or Firm* — Sughrue Mion, PLLC

(57) ABSTRACT

In some embodiments, a video decoder is capable of recovering skipped video data (e.g. motion vectors, prediction modes, quantization parameters, selected frequency-domain coefficients such as DC and 5-lowest-frequency AC coefficients, and/or entire video data blocks) using multiple alternative recovery modes such as spatial interpolation, temporal interpolation, and motion search. To decide whether to skip a particular data type for a block, the encoder evaluates the effect of skipping the data on rate and distortion by simulating the decoder data recovery using the multiple recovery modes. The encoder transmits indicators of skipped data types and associated recovery modes, if different from decoder baselines. The skipped data and recovery mode indicators may be included in macroblock and/or slice headers, and/or as part of sequence, group-of-picture (GOP), or picture coding parameter data. Skipped data recovery decoder resources (e.g. motion search logic) may be used for recovering data lost due to transmission errors.

33 Claims, 6 Drawing Sheets

(56) References Cited

OTHER PUBLICATIONS

Internet Engineering Task Force. "RTP Payload Format for H.263 Video Streams", RFC 2190, available for download at http://www.ietf.org/rfc/rfc2190.txt, Sep. 1997.

Liao, "Adaptive Intra Update for Video Coding Over Noisy Channels", IEEE International Conference on Image Processing, pp. 763-766. Sep. 1996.

Zeng, "Directional Spatial Interpolation for DCT-Based Low Bit Rate Coding", IEEE International Conf. Acoustic, Speech, and Signal Processing, pp. 2100-2103, May 1996.

Aign et al, "Temporal and Spatial Error Concealment Techniques for Hierarchical MPEG-2 Video Codecs", IEEE: 1778-1783, 1995.

Hemami, "Transform Coded Image Reconstruction Exploiting Interblock Correlation", IEEE Trans. Image Processing: 4:1023-1027, Jul. 1995.

Jung, "Error Concealment Technique Using Projection Data for Block-Based Image Coding", SPIE Conf. Visual Communications and Image Processing, 2308: 1466-1476, 1994.

Wang, "Maximally Smooth Image Recovery in Transform Coding", IEEE Trans. Comm., 41(10):1544-1551, Oct. 1993.

Lam, "Recovery of Lost or Erroneously Received Motion Vectors", IEEE International Conf. Acoustic, Speech, and Signal Processing, pp. 417-420, Apr. 1993.

Sun, "Error Concealment in Digital Simulcast AD-HDTV Decoder," IEEE Trans. Consumer Electronics, 38:108-117, Aug. 1992.

* cited by examiner

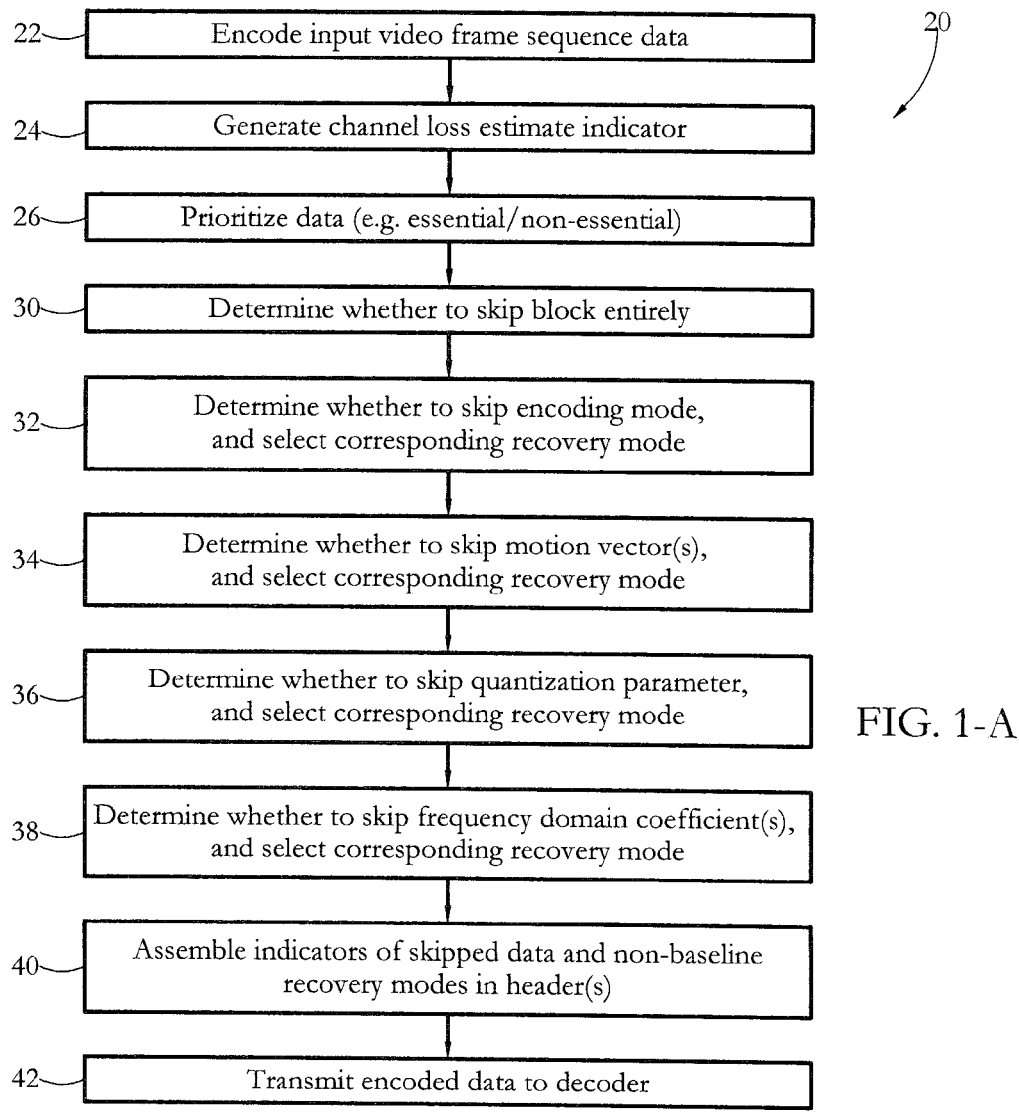
FIG. 1-A

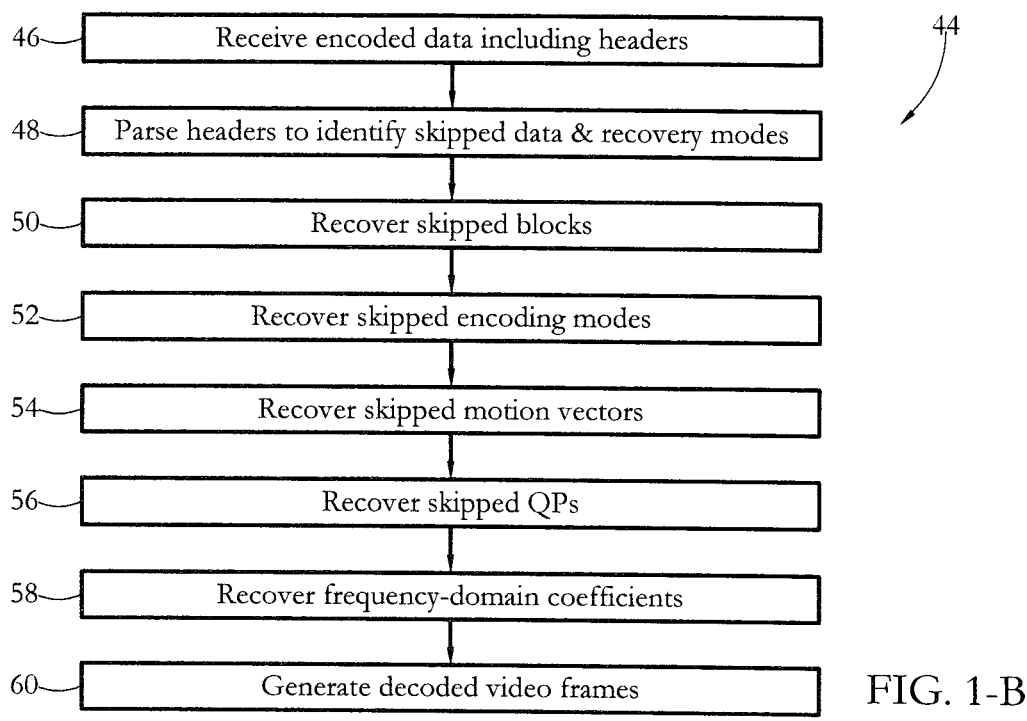
FIG. 1-B

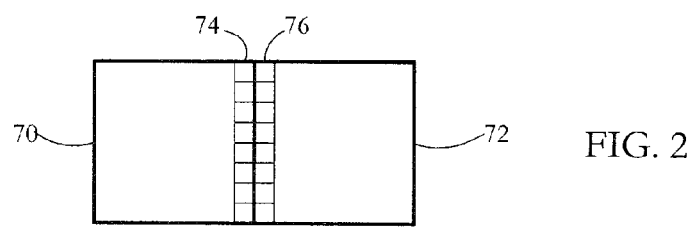
FIG. 2
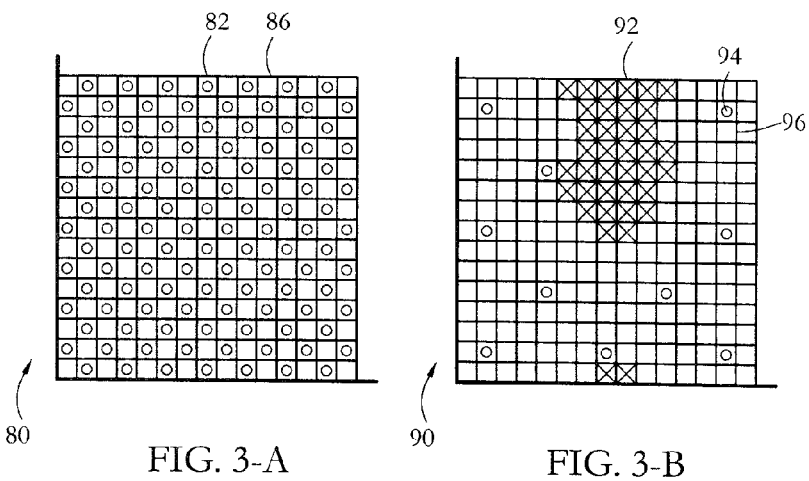
FIG. 3-A  FIG. 3-B
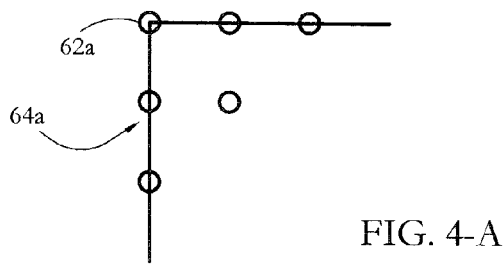
FIG. 4-A
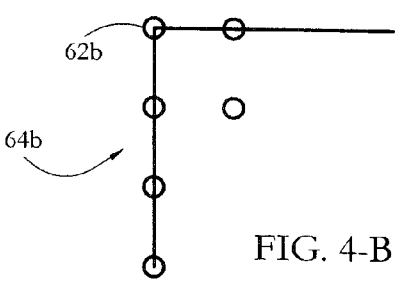
FIG. 4-B
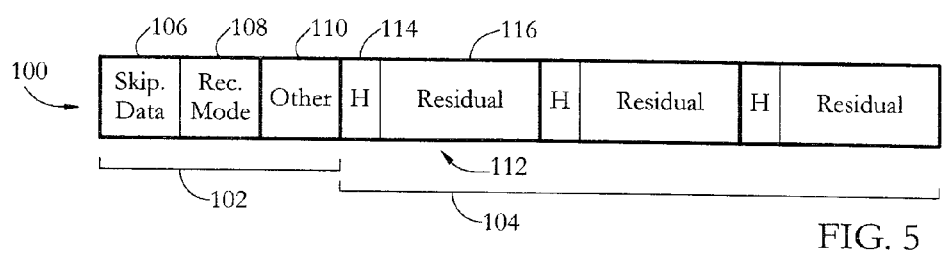
FIG. 5

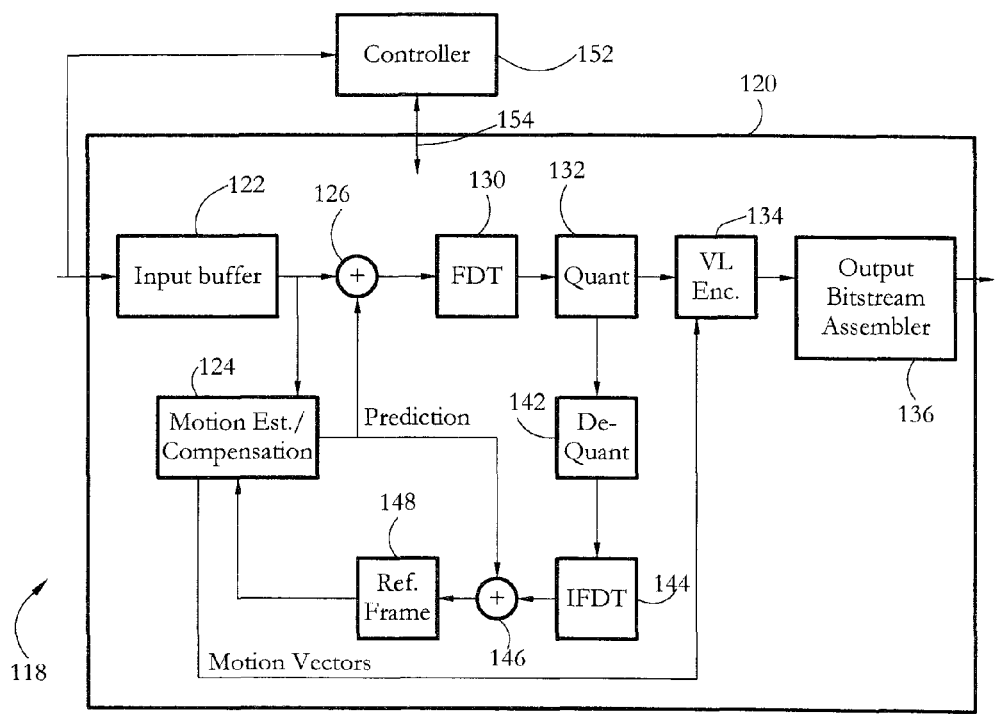
FIG. 6-A

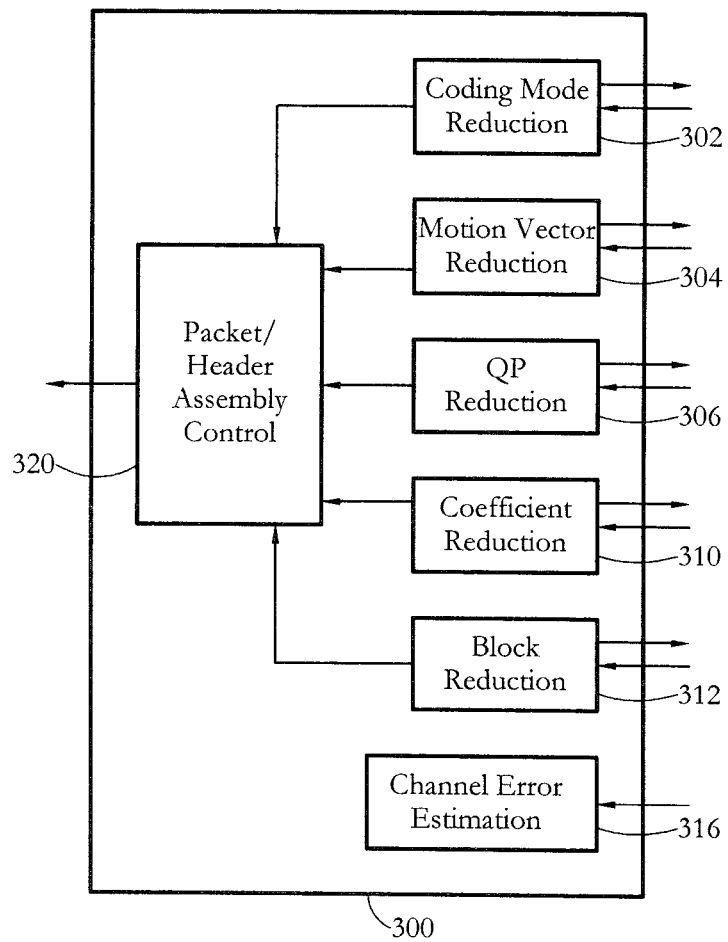
FIG. 6-B

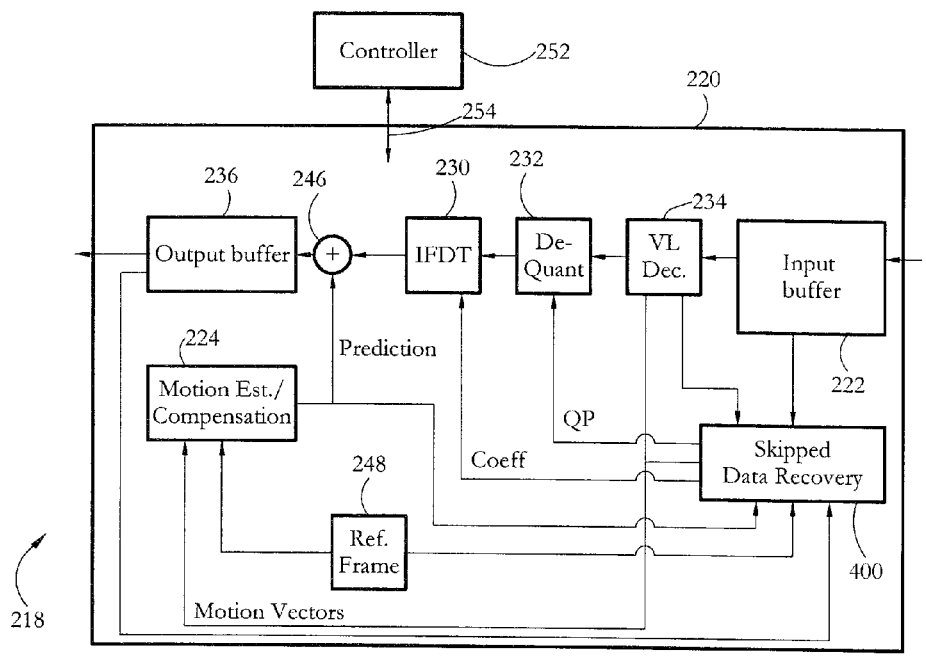
FIG. 7-A
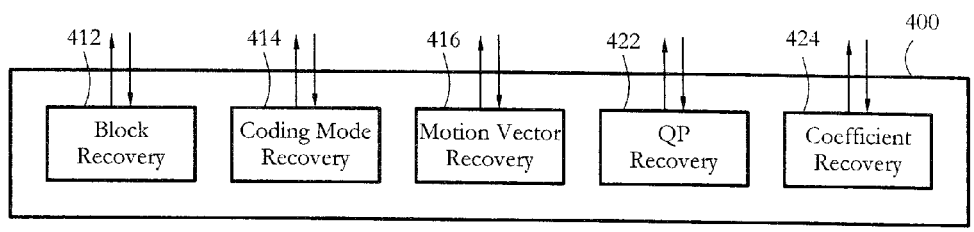
FIG. 7-B

SKIPPED VIDEO DATA RECOVERY USING MULTIPLE ALTERNATIVE RECOVERY MODES

RELATED APPLICATION DATA

This application is related to the concurrently-filed application Ser. No. 11/671,838, entitled "Motion Search Skipped Video Data Recovery," filed Feb. 6, 2007, which is herein incorporated by reference.

BACKGROUND

The invention relates to video data processing systems and methods, and in particular to video coding (encoding and/or decoding) systems and methods.

Commonly-used video encoding methods are based on MPEG (Moving Pictures Experts Group) standards such as MPEG-2, MPEG-4 (MPEG 4 Part 2) or H.264 (MPEG 4 Part 10, or AVC). Such encoding methods typically employ three types of frames: I- (intra), P- (predicted), and B- (bidirectional) frames. An I-frame is encoded spatially using data only from that frame (intra-coded). P- and B-frames are encoded using data from the current frame and other frames (inter-coded). Inter-coding involves encoding differences between frames, rather than the full data of each frame, in order to take advantage of the similarity of neighboring frames in typical video sequences. A P-frame employs data from one or more preceding frames in display order. A B-frame employs data from preceding and/or subsequent frames. Frames used as a reference in encoding other frames are commonly termed anchor or reference frames. In methods using the MPEG-2 standard, I- and P-frames can serve as anchor frames. In methods using the H.264 standard, I-, P-, and B-frames can serve as anchor frames. In methods using the H.264 standard, each macroblock in a frame may be predicted from a corresponding macroblock in any one of a number (e.g. 16) of anchor frames, and/or from another macroblock in the same frame. Different macroblocks in a frame may be encoded with reference to macroblocks in different anchor frames.

Inter-coded (P-and B-) frames may include both intra-coded and inter-coded blocks. For any given inter-frame block, the encoder may calculate the bit cost of encoding the block as an intra-coded block or as an inter-coded block. In some instances, for example in parts of fast-changing video sequences, inter-encoding may not provide encoding cost savings for some blocks, and such blocks can be intra-encoded. If inter-encoding provides desired encoding cost savings for a block, the block is inter-encoded.

Each frame is typically divided into multiple non-overlapping rectangular blocks. Blocks of 16×16 pixels are commonly termed macroblocks. Other block sizes used in encoders using the H.264 standard include 16×8, 8×16, 8×8, 8×4, 4×8, and 4×4 pixels. For each block in a frame, an encoder may search for a corresponding, similar block in that frame's anchor frames or in the frame itself. If a sufficiently similar block is not found, the current block is encoded non-predictively, without reference to external data. If a similar block is found, the MPEG encoder stores residual data representing differences between the current block and the similar block, as well as motion vectors identifying the difference in position between the blocks. The residual data is converted to the frequency domain using a transform such as a discrete cosine transform (DCT). The resulting frequency-domain data is quantized and variable-length (entropy) coded before storage/transmission.

Quantizing the data involves reducing the precision used to represent various frequency coefficients, usually through division and rounding operations. Quantization can be used to exploit the human visual system's different sensitivities to different frequencies by representing coefficients for different frequencies with different precisions. Quantization is generally lossy and irreversible. A quantization scale factor or quantization parameter QP can be used to control system bitrates as the visual complexity of the encoded images varies. Such bitrate control can be used to maintain buffer fullness within desired limits, for example. The quantization parameter is used to scale a quantization table, and thus the quantization precision. Higher quantization precisions lead to locally increased bitrates, and lower quantization precisions lead to decreased bitrates.

Designers of video encoding/decoding systems normally balance multiple constraints, including system bandwidth, channel error rates, distortion/image quality, various syntactical and other constraints imposed by video encoding standards, and/or processing and power resources required on the encoder and decoder sides. Video decoders, typically used for playback, tend to be used in higher numbers than encoders, which are used for recording or other video encoding. Moreover, playback devices having video decoders are often of lower-cost than recording or other devices including encoders. Video encoders tend to be more complex and costly than video decoders, and the computing resources available on the decoder side are often more scarce than those available on the encoder side. As a result, system designers often try particularly hard to minimize the processing resources required by video decoders. At the same time, emerging applications including mobile wireless video devices pose new challenges to system designers attempting to maximize perceived image quality in environments with limited bandwidth and available processing power.

Some video encoding/decoding systems allow the encoder to skip transmission of certain data, which is to be recovered by the decoder. For example, in the article "Geometric-Structure-Based Error Concealment with Novel Applications in Block-Based Low-Bit-Rate Coding," *IEEE Transactions on Circuits and Systems for Video Technology*, 9(4):648-665, June 1999, Zeng et al. describe a system in which the encoder intentionally skips transmission of certain macroblocks to the decoder. The decoder uses a pre-set spatial directional interpolation scheme to recover the data of a skipped macroblock using data from neighboring macroblocks.

SUMMARY

According to one aspect, a video data encoding method includes determining a decoding consequence of skipping transmission to a decoder of a target subset of an encoded video data set for a video image block by analyzing a predicted recovery of the target subset by the decoder according to a plurality of alternative decoder recovery modes. The encoded video data set for the video image block is generated by encoding a sequence of video frames. The decoding consequence of skipping transmission of the target subset to the decoder is used to decide whether to skip transmission of the target subset to the decoder. The target subset includes one or more data types selected from a block encoding mode, a motion vector, a quantization parameter, and a partial subset of a set of frequency domain coefficients for the video image block.

According to another aspect, a video data decoding method includes receiving from a video encoder a video data set encoding a video sequence; selecting a recovery mode of a plurality of alternative recovery modes; employing the video data set to recover a recovery data set for a video image block according to the recovery mode; and generating a decoded sequence of video frames from the recovery data set and the video data set. The recovery data set includes one or more data types selected from a motion vector, a quantization parameter, a block encoding mode, and a partial subset of frequency-domain coefficients for the video image block.

BRIEF DESCRIPTION OF THE DRAWINGS

The foregoing aspects and advantages of the present invention will become better to understood upon reading the following detailed description and upon reference to the drawings where:

FIG. 1-A shows a sequence of steps performed by a video image encoder according to some embodiments of the present invention.

FIG. 1-B shows a sequence of steps performed by a video image decoder according to some embodiments of the present invention.

FIG. 2 shows two exemplary neighboring 8×8 blocks, according to some embodiments of the present invention.

FIG. 3-A illustrates an exemplary checkerboard arrangement of skipped and non-skipped macroblocks, according to some embodiments of the present invention.

FIG. 3-B illustrates an exemplary periodic arrangement of skipped and non-skipped macroblocks in a frame having essential and non-essential regions, according to some embodiments of the present invention.

FIGS. 4-A-B show exemplary DC and 5 lowest-frequency AC coefficients in zig-zag order for a frame (progressive) block and a field (interlaced) block, respectively, according to some embodiments of the present invention.

FIG. 5 shows an exemplary slice video data packet having a slice header including a skipped data field and a recovery mode field, according to some embodiments of the present invention.

FIG. 6-A is a schematic diagram of an exemplary MPEG encoder according to some embodiments of the present invention.

FIG. 6-B is a schematic diagram of a data reduction part of the encoder of FIG. 6-A, according to some embodiments of the present invention.

FIG. 7-A is a schematic diagram of an exemplary MPEG decoder according to some embodiments of the present invention.

FIG. 7-B is a schematic diagram of a data recovery part of the decoder of FIG. 7-A, according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes two or more elements. The term "logic" refers to special-purpose hardware. Unless otherwise required, any described method steps need not be necessarily performed in a particular illustrated order. The statement that a second frame is anchored by a first frame means that the first frame serves as an anchor frame for the second frame. A first element (e.g. data) derived from a second element encompasses a first element equal to the second element, as well as a first element generated by processing the second element and optionally other data. The term block encompasses macroblocks (16×16 blocks), as well as blocks of other sizes, such as conventional macroblock partitions. Making a determination or decision according to a parameter encompasses making the determination or decision according to the parameter and optionally according to other data. Unless otherwise specified, an indicator of some quantity/data may be the quantity/data itself, or an indicator different from the quantity/data itself. It is understood that all recited parameters (e.g. motion vectors, encoding modes, quantization parameters, coefficients) encompass indicators or alternative representations of such parameters. As an example, a quantization parameter may be represented as a quantization parameter modulation (delta) indicating a difference between a quantization parameter baseline and a modulated quantization parameter value, and any recitation of an operation performed on a quantization parameter (e.g. transmission, skipping, recovery) encompasses operations performed on a quantization parameter modulation. As another example, a quantization parameter may be represented as a $\rho$-domain value (a percentage of zero-value frequency-domain coefficients, which is inversely related to quantization precision), and any recitation of an operation performed on a quantization parameter encompasses performing an operation on a $\rho$-domain value representative of a quantization parameter. An encoding mode for a block is understood to define operations performed on the block data, and not merely parameters for performed operations. Unless otherwise specified, it is understood that a recovered data set generated by a decoder need not be exactly identical to a corresponding skipped data set skipped by an encoder. Unless otherwise specified, any recited encoder or decoder may be implemented using any combination of special-purpose encoding/decoding logic and/or software code running on a programmable (e.g. general-purpose) processor. Computer readable media encompass storage media such as magnetic, optic, and semiconductor media (e.g. hard drives, optical disks, flash memory, DRAM), as well as communications links such as conductive cables and fiber optic links. Unless otherwise specified, transmitting data from an encoder to a decoder encompasses storing the data in a storage medium (e.g. DVD or hard drive) for later readout by the decoder, as well as communicating the data over a communication link such as an Internet connection. For example, a video encoding method which includes transmitting some data to a decoder may include storing the data on a DVD for later readout by the decoder, and similarly a video decoding method which includes receiving some data from an encoder may include reading the data from a DVD.

The following description illustrates embodiments of the invention by way of example and not necessarily by way of limitation.

FIG. 1-A shows a sequence of steps 20 performed by a video encoder according to some embodiments of the present invention. In a step 22, a sequence of video frames is encoded in a standard-compliant manner as a sequence of I-, P- and B-frames, without skipping a set of data types described below. Step 22 may be performed according to an MPEG video encoding standard such as H.264 (AVC). Step 22 results in an encoded video data set including quantized, frequency domain blocks, associated quantization parameters and encoding mode indicators (e.g. non-predicted, intra-predicted, inter-predicted encoding modes), and, for pre-dicted blocks, motion vectors.

In step 22, some data blocks are encoded non-predictively, without reference to data from other blocks, while other blocks are encoded predictively, with reference to intra-predictions (data within the same frame) or inter-predictions (data from other frames). In some embodiments, the encoding process of step 22 includes spatial (intra-) prediction using H.264 intra-prediction modes such as 4×4 luma prediction modes (e.g. vertical, horizontal, DC, diagonal-down-left, diagonal down-right, vertical-right, horizontal-down, vertical-left, horizontal-up), 16×16 luma prediction modes (e.g. vertical, horizontal, DC, and plane), and 8×8 chroma prediction modes (e.g. vertical, horizontal, DC, and plane). The encoding process of step 22 may also use interpolation based on geometric structures, using local geometric information generated from the pixels bordering the block whose data is to be predicted. For information on geometric-structure-based interpolation see for example Zeng et al., "Geometric-Structure-Based Error Concealment with Novel Applications in Block-Based Low-Bit-Rate Coding," *IEEE Transactions on Circuits and Systems for Video Technology,* 9(4): 648-665, June 1999. After a spatial prediction is generated, the resulting residual (the difference between the prediction and the input data) is transformed to the frequency domain and quantized.

In a step 24 the encoder computes or receives a channel loss estimate indicative of the error rate for transmissions between the encoder and a corresponding decoder. Step 24 may be employed in error-prone applications such as video streaming over the Internet or over a broadcast connection. In some embodiments, the encoder generates the channel loss estimate from a set of channel condition statistics received from a video data transmission application or device. In some embodiments, the channel condition statistics may include a fraction of dropped packets for the encoder-decoder connection. In error-free applications, such as DVD encoding, channel loss errors may be negligible.

In a step 26, the encoder prioritizes some data (e.g. particular areas of a frame, such as a subset of frame blocks) for transmission. In some embodiments, prioritizing the data may include dividing each frame into essential (e.g. high-priority, HP) and non-essential (e.g. standard priority, SP) regions according to the effect of region loss on system distortion. In some embodiments, prioritizing a region may include increasing a relative weight of a distortion part of a rate-distortion function for the prioritized region, to effectively make the prioritized region less tolerant of distortion. Step 26 may be particularly useful in error-prone applications such as applications involving transmission over the Internet.

In a sequence of steps 30-38, the encoder determines, for each encoded block (e.g. for each encoded macroblock), whether to skip transmission of the block entirely (step 30), and/or whether to skip partial block data such as a block encoding mode (step 32), motion vector(s) (step 34), quantization parameter (step 36), or partial subset of the block frequency domain coefficients (step 38). The decision whether to skip data includes determining a decoding consequence of skipping data by analyzing a predicted recovery of the skipped data by the decoder. Evaluating the decoding consequence may include determining a distortion, image smoothness/mismatch (e.g. block boundary pixel mismatch, energy mismatch), or other indicator of the error introduced by skipping the data.

For each skipped data type, the encoder may select a recovery mode from among a plurality of recovery modes available to the decoder. In some embodiments, evaluated recovery modes include motion search, spatial interpolation (interpolation within the current frame), and temporal interpolation (interpolation using data from one or more different frames). In some embodiments, the encoder simulates the results of a motion search to be performed by the decoder according to criteria mutually-agreed upon by the encoder and decoder or signaled out-of-band or as part of header information, as described in detail below. If the selected recovery mode differs from the decoder's baseline recovery mode, the encoder may transmit the selected recovery mode to the decoder. For example, in some embodiments, the decoder may use spatial interpolation as a baseline recovery mode. If the encoder selects spatial interpolation as the recovery mode for a block or partial block data, no identifier of the recovery mode is transmitted to the decoder for that data. If the encoder selects temporal interpolation or motion search, an identifier of the recovery mode selected for the skipped data is transmitted to the decoder. Recovery mode identifiers may be transmitted as part of a session setup protocol or as part of image sequence, group-of-picture (GOP), picture, slice, or macroblock coding parameter information. In some embodiments, the decoder may use different baseline recovery modes for different data types within a given block. In some embodiments, the decoder may try all available recovery modes, and select the recovery mode that yields an optimal measure of image smoothness/mismatch; in such embodiments, the encoder may skip transmitting the recovery mode to the decoder if the recovery mode selected by the decoder yields acceptable rate/distortion performance.

In some embodiments, to determine whether to skip a given data type or combination of data types described below with reference to steps 30-38, the encoder uses the channel loss estimate determined in step 24 and information on how the decoder will recover the skipped data to determine a consequence of skipping the data on the system rate and distortion for each recovery mode. The channel loss estimate may be used to determine expectation values for system evaluation parameters such as distortion. For example, an expected distortion value may increase with a probability of data loss reflected in the channel loss estimate. The recovery mode selected by the encoder may be a recovery mode yielding an optimal rate-distortion performance for a distortion expectation value which depends on channel loss statistics.

In some embodiments, the decision whether to skip transmission of particular data and the associated recovery mode selection may be performed according to a predetermined distortion criterion for each block. If prediction of skipped data from neighboring transmitted blocks results in distortion exceeding a predetermined threshold, the encoder does not skip transmission of the data. The encoder determines the data resulting from recovery of the skipped data by the decoder, and compares the recovery results to the true skipped data to determine whether the block distortion is acceptable. The distortion may be measured as the mean-square error or absolute difference between the reconstructed block and the original block. If the data is to be skipped, the encoder may select the recovery mode that yields the least distortion.

In some embodiments, the decision whether to skip transmission of particular data and the associated recovery mode selection may be performed according to one or more criteria/metrics measuring a smoothness of the resulting image. For example, the encoder may select prediction modes and prediction data that minimize a total energy variation among neighboring blocks, and/or that minimize a boundary matching error, i.e. that yield minimal pixel differences along the borders of neighboring blocks. FIG. 2 shows two exemplary 8×8 blocks 70, 72 including adjacent border pixel strips 74, 76. If blocks 70, 72 form part of a typical continuous video image, the luma and chroma values at each pixel along strip 74 are close to equal to the corresponding luma and chroma values of the neighboring pixel along strip 76. Thus, a sum of differences (e.g. sum of absolute values or squares of differences) between corresponding border pixels of two blocks will generally be lower if the two blocks are neighbors than otherwise. The encoder may decide not to skip transmission of a given data type if the resulting image smoothness measure does not meet a predetermined condition.

The image smoothness performance/evaluation criteria are known a priori to both the encoder and decoder, and may be used by the decoder to identify selected predictions and/or prediction modes by performing the same analysis as that performed by the encoder. In some embodiments, the encoder and decoder use by default a baseline image smoothness evaluation criterion. If the encoder selects a different image smoothness evaluation criterion, the encoder transmits an identifier of the selected criterion to the decoder. No criterion identifier is sent if the baseline criterion is used. The selected criterion identifier may be transmitted as part of a session setup protocol or as part of the sequence, group-of-picture (GOP), or picture coding parameter information.

In some embodiments, the encoder evaluates the effects of skipping data for a block on the distortion in that block. In some embodiments, the encoder may also evaluate the effects of skipping data in a current block on the distortion resulting in other blocks, for example in blocks whose decoding uses the skipped data from the current block.

In some embodiments, the data skipping and recovery mode decisions proceed in the exemplary order shown in FIG. 1-A: first at the whole-block level (step 30), then, within each block, starting with the block encoding mode and proceeding with motion vector(s), quantization parameter, and finally frequency-domain coefficients (steps 32-38). In other embodiments, the data skipping decision order may be different from that shown in FIG. 1-A.

In a step 30 the encoder determines a subset of blocks whose transmission may be entirely skipped. Skipping transmission may include withholding the block data from a storage medium (e.g. DVD), or withholding communication of the block over a communications link to a decoder. In some embodiments, the skipped blocks are chosen using a periodic (e.g. checkerboard) baseline pattern subject to a distortion criterion check as described below. A baseline arrangement for the skipped blocks in a frame may be a spatially-periodic (e.g. checkerboard) pattern. The spatial period of the pattern may be chosen to be two blocks or higher along the vertical and/or horizontal axes. If the spatial period along both axes is two blocks, the resulting checkerboard pattern includes about half skipped and half non-skipped to blocks, with each skipped block having non-skipped top, bottom, left and right neighbors. If other spatial periods are employed, the encoder may require that any skipped block have top, bottom, left and right non-skipped neighbors, to facilitate a recovery of the skipped block as described in detail below. FIG. 3-A shows a part of an exemplary frame 80 including skipped macroblocks 82 and non-skipped macroblocks 86 arranged in a checkerboard pattern. FIG. 3-B shows a part of an exemplary frame 90 including an essential zone 92 containing only non-skipped macroblocks, and a non-essential remainder including skipped blocks 94 and non-skipped blocks 96. The skipped blocks in FIG. 2-B are arranged in a spatially-periodic pattern. In some embodiments, the locations of skipped blocks in a video frame sequence may be distributed temporally across multiple frames, in addition to spatially within a frame. For example, spatially-periodic patterns in temporally-neighboring frames may be arranged so that a block at any given location is not skipped in consecutive frames.

In some embodiments, a distortion criterion may be used as a check on a baseline spatial and/or temporal tentative distribution of skipped blocks. If prediction of a block from neighboring transmitted blocks results in distortion exceeding a predetermined threshold, the encoder does not skip the block, even if the baseline arrangement identified the block as a skipped block candidate.

In a step 32 (FIG. 1-A), the encoder determines whether to skip transmission of a block encoding (e.g. prediction) mode for the current block, and identifies/selects a corresponding recovery mode to be used by the decoder to recover the skipped encoding mode. The block encoding mode may identify whether the block is non-predicted, intra- (I) predicted, or inter-(P or B) predicted, and may identify any block partitions and/or associated reference frame(s), if applicable. The encoder may evaluate multiple prediction candidates and/or prediction algorithms for the spatial and/or frequency-domain prediction steps to be performed by the decoder, and may decide to skip transmission of the encoding mode and prediction(s) if the decoder's attempt to recover the skipped data leads to acceptable system rate/distortion performance. The encoder determines how the decoder will recover the skipped prediction mode according to the decoder baseline recovery mode and alternative recovery modes. For example, for a spatial interpolation recovery mode, the decoder may select an encoding mode for the current block according to the encoding mode(s) of one or more of the current block's neighbors. As another example, the decoder may select a prediction algorithm and prediction data that yield an optimal block boundary matching error.

In a step 34 (FIG. 1-A), for intra-predicted and/or inter-predicted blocks, the encoder determines whether to skip transmission of a set of motion vectors, and identifies/selects a corresponding recovery mode to be used by the decoder to recover the skipped motion vector(s). To determine whether to skip transmission of a motion vector for a predicted block, the encoder evaluates an effect of skipping transmission of the motion vector by replicating a recovery of the motion vector as would be performed by the decoder, and determining the distortion resulting from the recovery process for each available recovery mode. In some embodiments, the decoder sets a skipped motion vector to be equal to the motion vector of a selected neighboring block in the current frame or in a reference frame for the current frame. In some embodiments, the selected neighboring block is the block whose selection leads to a minimization in a boundary matching error (FIG. 2). To select the neighboring block, the encoder identifies a subset of neighbors to be considered as candidates for the motion vector. Such a subset of neighbors may be, for example, the immediate spatial neighbors of the current block. The encoder then determines the boundary matching error resulting from using each identified neighbor's motion vector as the current block's motion vector, and selects the identified neighbor corresponding to a minimal boundary matching error. In some embodiments, the encoder and decoder may use other motion vector selection criteria. For example, the encoder and decoder may both use a median of three motion vectors corresponding to the neighboring blocks to the left, above-left, and above the current block. In some embodiments, the encoder identifies and selects one of multiple motion vector recovery modes, and transmits the recovery mode to the decoder as described below.

In a step 36 (FIG. 1-A), the encoder determines whether to skip transmission of a block quantization parameter, and identifies/selects a corresponding recovery mode to be used by the decoder to recover the quantization parameter. To determine whether to skip transmission of a quantization parameter for a block, the encoder evaluates the effect of skipping transmission of the quantization parameter by replicating a recovery of the quantization parameter as would be performed by the decoder, and determining the distortion resulting from the recovery process for to each recovery mode.

In a step 38 (FIG. 1-A), the encoder determines whether to skip transmission of a partial subset of frequency-domain coefficients, and identifies/selects a corresponding recovery mode to be used by the decoder to recover the partial subset of frequency-domain coefficients. The encoder may perform a frequency-domain prediction step including generating a residual equal to a difference between the quantized frequency-domain transform coefficients of the current block to be predicted and the corresponding quantized frequency-domain transform coefficients of one or more neighboring blocks. The neighboring blocks may be different macroblocks, or different partitions of a macroblock.

In some embodiments, frequency-domain prediction is performed for the DC coefficient and for a predetermined number of low-frequency AC coefficients, e.g. the 5 lowest-frequency AC coefficients in zig-zag order. FIG. 4-A shows an exemplary DC coefficient 62a and the 5-lowest-frequency AC coefficients 64a in zig-zag order for a frame block (progressive sampling), while FIG. 4-B shows an exemplary DC coefficient 62b and the 5 lowest-frequency AC coefficients 64b in zig-zag order for a field block (interlaced sampling).

The DC coefficient values may be generated by bilinear interpolation from the nearest top and bottom blocks (e.g. the top/bottom macroblocks or partitions). AC coefficient values may also be interpolated from one or more neighboring blocks. In some embodiments, particularly in error-free applications, the closest right and left blocks may also be used for coefficient interpolation. In error-prone applications, lost data often includes a sequence of horizontal macroblocks (a horizontal stripe), which makes horizontal interpolation less useful. For further information on performing frequency-domain prediction see for example Sun et al., "Error Concealment in Digital Simulcast AD-HDTV Decoder," *IEEE Transactions on Consumer Electronics*, 38(3):108-118, August 1992. In some embodiments, frequency-domain predictions may also be generated for inter-predicted blocks of P- and B-frames.

In some embodiments, the encoder maintains a data structure indicating which data/parameters (blocks, coefficients, motion vectors, QPs, prediction modes) in a frame have been chosen to be skipped, and thus would not be available to the decoder. The skipped data/parameter data structure may be used in simulating decoder operations for choosing data/parameters to skip as described above.

In a step 40 (FIG. 1) the encoder assembles a set of data packets, each of which may correspond to a slice including an integer number of macroblocks. FIG. 5 shows an exemplary slice data packet 100 including a slice header 102 and a slice payload 104. Slice header 102 includes multiple fields, including a skipped data indicator field 106, a recovery mode field 108, and other fields schematically shown at 110. Fields 110 may include information on the slice type (e.g. I, B, P) and the frame the slice belongs to, as well as reference frame management information. Slice payload 104 includes a sequence of coded macroblocks 112 including macroblocks A, B, and C. The slice payload 104 comprises a macroblock header 114 and a coded residual 116 for each of macroblocks A, B and C. Macroblock header 114 may include data such as indicators of macroblock type (I, P, B), partition size, prediction mode, quantization parameter modulation (delta), reference frame(s), and partition/macroblock motion vector(s).

Skipped data indicator field 106 includes indicators of the skipped data types described above for each macroblock in the current slice, while recovery mode field 108 includes indicators of recovery modes for the skipped data types. For example, skipped data indicator field 106 may indicate that for macroblock A the encoder has skipped transmission of the macroblock quantization parameter (e.g. the quantization parameter modulation for the macroblock) and the macroblock and/or partition motion vector(s), for macroblock B the encoder has skipped transmission of the low-frequency transform coefficients, and macroblock C has been skipped entirely. Recovery mode field 108 may then indicate recovery modes for the quantization parameter and motion vectors of macroblock A, the low-frequency transform coefficients of macroblock B, and for the various data types of macroblock C. In some embodiments, skipped data indicator field 106 and recovery mode field 108 may be provided as an integrated skipped data and recovery mode field. In some embodiments, some or all of the data of skipped data field 106 and recovery mode field 108 may be provided at the macroblock level, in each macroblock header 114. In some embodiments, some or all of the data of skipped data field 106 and recovery mode field 108 may be provided as part of a session protocol setup or as part of frame sequence, group of pictures (GOP), and/or picture coding parameter information.

In a step 42, the encoded data packets are transmitted to the decoder. Step 42 may be performed by transmitting the data over a communications link such as the Internet, and/or writing the data to a storage medium such as a DVD or disk drive.

FIG. 1-B shows a sequence of steps 44 performed by a video decoder according to some embodiments of the present invention. In a step 46, the decoder receives a set of data packets including encoded video data. The data packets include slice and/or macroblock headers including indicators of skipped data and recovery modes, as described above with reference to FIG. 5. The decoder may receive the video data over a communications link or from a storage medium. In a step 48, the decoder parses the packet headers to identify skipped data and corresponding recovery modes.

In a sequence of steps 50-58 the decoder recovers any skipped whole blocks, encoding modes (step 52), motion vectors (step 54), quantization parameters (step 56), and frequency-domain coefficients (step 58) as described above. The decoder performs the recovery operations according to its baseline recovery mode(s) and/or recovery modes identified in packet headers. The recovery operations are performed in an identical manner to the evaluation/recovery operations performed by the encoder and described above. In a step 60, the decoder uses the recovered data to generate a set of decoded video frames.

FIG. 6-A is a schematic diagram of the structure of an exemplary MPEG encoder 118 according to some embodiments of the present invention. Encoder 118 generates an output bitstream, which is transmitted to a storage device or communications link for subsequent decoding by a video decoder. Encoder 118 may be implemented using special-purpose hardware, and/or software running on a programmable processor. In some embodiments, encoder 118 can be provided as part of a special-purpose integrated circuit controlling an operation of a device such as a digital video recorder. In some embodiments, encoder 118 can be implemented using software running on a general-purpose computer. In some embodiments, encoder 118 includes a special-purpose hardware encoding unit 120, and a software-programmable controller 152 controlling the operation of encoding unit 120. Controller 152 may include a general-purpose central processing unit (CPU), or a microcontroller such as a digital signal processor (DSP). Encoding unit 120 may be implemented using special-purpose hardware blocks (logic). In some embodiments, at least parts of encoding unit 120 can be implemented using software running on a programmable processor. Controller 152 is connected to various functional blocks of encoding unit 120, as illustrated by the connection arrow 154 FIG. 6-A. The various connections between the functional blocks shown in FIG. 6-A may be implemented directly, or through one or more intermediary structures such as a data switch operating under the control of controller 152.

Encoding unit 120 includes an input buffer 122, which receives an input bit sequence, and an output bitstream assembler 136, which outputs an output bitstream including video data packets, as described above. A number of functional blocks are connected in series between input buffer 122 and output bitstream assembler 136: a differential processing unit 126, a frequency-domain transform (FDT) unit 130, a quantization unit 132, and a variable length (entropy) encoder unit 134. A predictive part of the encoder includes a plurality of functional blocks connected between quantization unit 132 and input buffer 122: a de-quantization (inverse quantization) unit 142, an inverse frequency-domain transform (IFDT) unit 144, a differential processing unit 146, a reference frame storage unit 148, and a motion estimation and compensation unit 124. In some embodiments, encoding unit 120 may include functional units other than the units shown in FIG. 6-A, such as a de-blocking filter. A de-blocking filter may be connected to the output of differential processing unit 146, to reduce blocking distortions caused by dividing a frame into macroblocks for encoding.

Input buffer 122 receives an input bit sequence and buffers the input frame data for subsequent processing. Buffering is used for example for encoding P-frames or B-frames for which the encoding order may be different from the input/display orders. Controller 152 executes software instructions that control the operation of encoder 118, and in particular define block encoding modes and other encoding parameters for data to be encoded, as described below.

For predictively-encoded data, differential processing unit 126 subtracts compensated coded intra- or inter-prediction data from corresponding input frame data to generate residuals to be encoded. FDT unit 130 transforms space-domain data (residuals or non-predictively coded data) into corresponding frequency-domain data. Quantization unit 132 quantizes the frequency-domain data using stored quantization table data and quantization parameters received from controller 152. Variable-length encoder 134 applies an entropy coding operator to quantized data received from quantization unit 132, and, for inter-coded frames, to motion vector data received from motion estimation/compensation unit 124.

Motion estimation/compensation unit 124 receives input uncompressed video data from input buffer 122 and reference frame data from reference frame storage unit 148, and outputs prediction and corresponding motion vector data. Motion estimation/compensation unit 124 is used among others to simulate decoder recovery operations as described above. De-quantization unit 142 de-quantizes data received from quantization unit 132, and IFDT unit 144 applies an inverse discrete cosine transform operator to the resulting de-quantized data. Processing unit 146 adds prediction data received from motion estimation/compensation unit 124 to decoded residuals received from IFDT unit 144 to generate inter-encoded reference frames. Storage unit 148 stores decoded reference frames.

Non-predictively-encoded data follow essentially a straight path through encoder 120, from input buffer 122 to bitstream assembler 136. De-quantization unit 142 and IFDT unit 144 are used to generate a decoded reference frame data, which is stored in reference frame storage unit 148.

Predictively-coded blocks are encoded differentially, with respect to corresponding reference frame blocks stored in reference frame storage unit 148. Reference frame (prediction) data is subtracted from current frame data by differential processing unit 126, and the resulting residuals are transformed by FDT unit 130, quantized by quantization unit 132, and encoded by variable-length encoder 134. If an inter-coded frame serves as an anchor frame, a reference frame is constructed by decoding the frame. Processing block 146 adds residual data generated by de-quantization unit 142 and IFDT unit 144 to intra-coded prediction data received from motion estimation/compensation unit 124 to generate reference frame data. The reference frame data are stored in reference frame storage unit 148, and are used to encode other predictively-encoded data.

FIG. 6-B shows a schematic diagram of a data reduction unit 300, which may form part of controller 152. Data reduction unit 300 includes a coding mode data reduction unit 302, a motion vector data reduction unit 304, a quantization parameter data reduction unit 306, a frequency-domain coefficient reduction unit 310, a block reduction unit 312, a channel error estimation unit 316, and a packet/header assembly control unit 320. Each data reduction unit 302, 304, 306, 310, 312 is connected to channel error estimation unit 316, packet/header assembly control unit 320, and to other parts of encoder 118 as described below.

Channel error estimation unit 316 is connected to an output communication link of encoder 118. Channel error estimation unit 316 receives a set of output channel condition data such as indicators of packet losses, and generates a channel loss estimate indicator indicative of the loss rate of the output communication link. Channel error estimation unit 316 makes the channel loss estimate indicator available to data reduction units 302, 304, 306, 310, 312.

Data reduction units 302-312 perform the steps described above with reference to FIG. 1-A for encoding modes, motion vectors, quantization parameters, frequency-domain coefficients, and whole blocks, respectively. In particular, each data reduction unit 302-312 determines whether to skip its corresponding data type for the current block, and identifies/selects a corresponding recovery mode to be used by the decoder to recover the skipped data. Each data reduction unit 302-312 sends to packet/header assembly control unit 320 an indicator that transmission of corresponding data for the current block will be skipped, and an indicator of the selected recovery mode if different from the decoder baseline recovery mode.

Block reduction unit 312 determines whether to skip transmission of the entire data of a block, for at least a subset of blocks encoded by encoder 118. In some embodiments, block reduction unit 312 is activated only when the analyses performed by the data reduction units 302, 304, 306, 310 indicate that the corresponding data types are to be skipped for a block. In some embodiments, block reduction unit 312 initially selects a tentative skipped block according to a pre-determined baseline pattern (e.g. a spatial checkerboard pattern and/or a temporal pattern), and determines whether the tentative selection results in acceptable distortion by recovering the block as the decoder would.

Packet/header assembly control unit 320 receives indicators of data types to be skipped and corresponding recovery modes (if any) for each block from data reduction units 302, 304, 306, 310, 312. Packet/header assembly control unit 320 directs the assembly of video data packets having slice and/or macroblock headers indicating skipped data types and recovery modes, as described above with reference to FIG. 5.

FIG. 7-A is a schematic diagram of the structure of an exemplary MPEG decoder 218 according to some embodiments of the present invention. Decoder 218 receives an encoded video bitstream from a storage device or communications link, and generates a sequence of decoded video frames for playback on a display device. Decoder 218 may be implemented using special-purpose hardware, and/or software running on a programmable processor. In some embodiments, decoder 218 can be provided as part of a special-purpose integrated circuit controlling an operation of a device such as a digital video player. In some embodiments, decoder 218 can be implemented using software running on a general-purpose computer. In some embodiments, decoder 218 includes a special-purpose hardware decoding unit 220, and a software-programmable controller 252 controlling the operation of decoding unit 220. Controller 252 may include a general-purpose central processing unit (CPU), or a microcontroller such as a digital signal processor (DSP). Decoding unit 220 may be implemented using special-purpose hardware blocks (logic). In some embodiments, at least parts of decoding unit 220 can be implemented using software running on a programmable processor. Controller 252 is connected to various functional blocks of decoding unit 220, as illustrated by the connection arrow 254 FIG. 7-A. The various connections between the functional blocks shown in FIG. 7-A may be implemented directly, or through one or more intermediary structures such as a data switch operating under the control of controller 252.

Decoding unit 220 includes an input buffer 222, which receives MPEG-encoded input data, and an output buffer 236, which outputs a decoded video data signal to a display device. A number of functional blocks are connected in series between input buffer 222 and output buffer 236: a variable length decoder unit 234, an inverse quantization unit 232, an inverse frequency-domain transform (IFDT) unit 230, and a differential processing unit 246. A motion estimation and compensation unit 224 is connected to differential processing unit 246 and to a reference frame storage unit 248. In some embodiments, decoding unit 220 may include functional units other than the units shown in FIG. 7-A, such as a de-blocking filter. A de-blocking filter may be connected to the output of differential processing unit 246, to reduce blocking distortions caused by dividing a frame into macroblocks for encoding.

Input buffer 222 receives a sequence of input video data packets including headers and payloads as described above, and buffers the input packets for subsequent processing. In some embodiments, controller 252 parses the headers of the received video data packets and extracts decoding parameters and indicators of skipped data types and corresponding recovery modes for the skipped data. Controller 252 executes software instructions that control the operation of decoder 218 according to the extracted decoding parameters and skipped data recovery parameters. Variable-length decoder 234 applies a variable-length decoding operator to the received video data. The data is inversely quantized by inverse quantization unit 232, transformed from the frequency domain to the spatial domain by IFDT unit 230, and, for predictively-encoded data, added by differential processing unit 246 to prediction data generated by motion estimation/compensation unit 224, and sent to output buffer 236. Motion estimation/compensation unit 224 generates the prediction data using reference frame data received from reference frame storage unit 248. Motion estimation/compensation unit 224 also performs motion searches to recover skipped or otherwise lost data if the data is recovered using a motion search recovery mode.

A skipped data recovery unit 400 is connected to input buffer 222, variable-length decoding unit 234, inverse quantization unit 232, IFDT unit 230, motion estimation/compensation unit 224, reference frame storage unit 248, output buffer 236, and controller 252. Skipped data recovery unit 400 receives indicators of skipped data and associated recovery modes from controller 252, and performs a recovery of the skipped data.

FIG. 7-B shows an internal structure of skipped data recovery unit 400 according to some embodiments of the present invention. Skipped data recovery unit 400 includes a block recovery unit 412, a coding mode recovery unit 414, a motion vector recovery unit 416, a quantization parameter recovery unit 422, and a frequency-domain coefficient recovery unit 424. Skipped data recovery unit 400 performs a recovery of skipped data as described above with reference to FIG. 1-B. The recovery algorithms used by skipped data recovery unit 400 are those performed by the encoder in the process of identifying the consequences of skipping data, as described above.

Each recovery unit 412, 414, 416, 422, 424 receives from controller 252 an indicator that its corresponding data type has been skipped for a given block, receives video data needed to perform the recovery, and makes the recovered data available to controller 252 and/or other units of decoder 218. For example, recovered blocks may be sent to output buffer 236 and reference frame storage unit 248, motion vectors to motion estimation/compensation unit 224, quantization parameters to inverse quantization unit 232, and frequency-domain coefficients to IFDT unit 230. Each recovery unit 412, 414, 416, 422, 424 may include logic capable of performing recovery of skipped data by spatial and/or temporal interpolation, and may employ the logic of motion estimation/compensation unit 224 to recover data by motion search.

In some embodiments, controller 252 infers that one or more blocks have been skipped by comparing identifiers of the last transmitted block in one video data packet to the first transmitted block in the immediately subsequent video data packet. In such embodiments, it may not be needed to include a skip flag or other indicator that some blocks have been skipped. For example, if the last transmitted macroblock in a first video data packet is macroblock #316, and the first transmitted macroblock in a second video data packet immediately following the first packet is macroblock #320, controller 252 infers that transmission of macroblocks #317-319 has been skipped, and instructs block recovery unit 424 to perform a recovery of the skipped macroblocks.

In some embodiments, skipped data recovery unit 400 is used to recover missing data lost due to transmission errors, rather than deliberate skipping. Transmission errors may lead to the loss of indicators that data has been skipped (e.g. skip flags) and recovery mode information, in addition to the loss of other video data such as frequency-domain coefficients, quantization parameters, encoding modes, and motion vectors. If such data is lost, skipped data recovery unit 400 may identify the absence of lost data and choose a recovery mode that yields an optimal result according to an image smoothness criterion (e.g. minimizing boundary matching errors), to as described above.

The exemplary systems and methods described above allow a decoder to recover skipped data in multiple alternative ways, including by performing a motion search according to criteria mutually agreed upon by the encoder and decoder or transmitted by the encoder out-of-band or as part of header information. In some embodiments, the systems and methods described above allow eliminating some redundancies in encoded video frames. When prediction modes, motion vectors, quantization parameters, low-frequency coefficients, and/or the entire data of certain blocks can be adequately recovered by the decoder, skipping transmission/encoding of such data may allow system bandwidth savings at the expense of additional processing performed by the encoder and decoder, and, depending on the criteria used to decide whether to skip data, possibly at the expense of system distortion. A decoder capable of recovering such skipped data types may include relatively complex data recovery components such as logic capable of performing motion searches. At the same time, at least some of the skipped data recovery processing resources of the decoder may also be used for recovering data lost due to transmission errors. The bandwidth savings achieved by eliminating redundancies in the encoded video stream can be of particular use in applications using limited bandwidth, such as in wireless mobile video applications.

It will be clear to one skilled in the art that the above embodiments may be altered in many ways without departing from the scope of the invention. Various hardware and software configurations and techniques can be used to implement skipped-data encoding and decoding as described above. In some embodiments the illustrated structures represent special-purpose logic blocks. In some embodiments, the described encoding/decoding functionality can be implemented using software running on a general-purpose processor or microcontroller. While the discussion above focused on discrete cosine transforms (DCT), other space-to-frequency-domain transforms (and their inverse transforms) such as Hadamard, Fourier or wavelet transforms can be used in some embodiments. In some embodiments, the operations described above with reference to block are performed for macroblocks (16×16 blocks); in other embodiments, various operations may be performed for blocks of other sizes (e.g. 8×8, 4×8, and/or 4×4 macroblock partitions). Accordingly, the scope of the invention should be determined by the following claims and their legal equivalents.

What is claimed is:

1. A video encoding method comprising:
    receiving a sequence of video frames, each frame comprising a plurality of non-overlapping rectangular blocks;
    encoding the sequence of video frames to generate an encoded video data set for each of the plurality of non-overlapping rectangular blocks included in the video frames, wherein the encoded video data set comprises a block encoding mode, a motion vector, a quantization parameter, and a set of frequency domain coefficients for each image block;
    determining, on a block-by-block basis, a decoding consequence of skipping transmission to a decoder of a target subset of the encoded data set for each image block by analyzing a predicted recovery of the target subset by the decoder according to a plurality of alternative decoder recovery modes, wherein the target subset includes at least one block-level parameter set in the encoded data set; and
    deciding, on a block-by-block basis, whether to skip transmission of the target subset to the decoder according to the decoding consequence of skipping transmission of the target subset to the decoder.

2. The method of claim 1, wherein the plurality of alternative recovery modes includes an interpolation mode.

3. The method of claim 2, wherein the interpolation mode is a spatial interpolation mode.

4. The method of claim 2, wherein the interpolation mode is a temporal interpolation mode.

5. The method of claim 1, wherein the plurality of alternative recovery modes includes at least one of a spatial interpolation mode and a temporal interpolation mode.

6. The method of claim 1, wherein the target subset includes at least one of the block encoding mode, the motion vector, the quantization parameter, and a partial subset of the set of frequency domain coefficients.

7. The method of claim 6, wherein the partial subset of the set of frequency domain coefficients consists of a DC coefficient and a set of 5-lowest-frequency AC coefficients in zig-zag order.

8. The method of claim 1, further comprising transmitting to the decoder an indicator that transmission of the target subset has been skipped, as it is decided to skip transmission of the target subset to the decoder.

9. The method of claim 1, further comprising transmitting to the decoder an indicator of a selected recovery mode to be used by the decoder to recover the target subset.

10. The method of claim 1, further comprising assembling a video data packet including a header and a video data payload, wherein the header includes an indicator that transmission of the target subset has been skipped.

11. The method of claim 1, wherein determining the decoding consequence of skipping transmission of the target subset to the decoder comprises determining a distortion resulting from skipping transmission of the target subset to the decoder.

12. The method of claim 1, comprising deciding whether to skip transmission of the target subset to the decoder of according to an indicator of a loss rate for an encoder-decoder communications channel.

13. The method of claim 1, further comprising:
    determining a decoding consequence of entirely skipping transmission of the video image block to the decoder by analyzing a predicted recovery of the video image block by the decoder according to the plurality of alternative decoder recovery modes; and
    deciding whether to entirely skip transmission of the video image block to the decoder according to the decoding consequence of entirely skipping transmission of the video image block to the decoder.

14. The method of claim 6, wherein the target subset to be skipped varies on a block-by-block basis within each frame.

15. A video data encoder comprising:
    an input buffer to receive a sequence of video frames, each frame comprising a plurality of non-overlapping rectangular blocks;
    video encoding logic configured to encode the sequence of video frames to generate an encoded video data set for each of the plurality of non-overlapping blocks in the video frames, wherein the encoded video data set comprises a block encoding mode, a motion vector, a quantization parameter, and a set of frequency domain coefficients for each image block; and
    at least one data reduction unit connected to the video encoding logic and configured to determine, on a block-by-block basis, a decoding consequence of skipping transmission to a decoder of a target subset of the encoded data set for each image block by analyzing a predicted recovery of the target subset by the decoder according to a plurality of alternative decoder recovery modes, wherein the target subset includes at least one block-level parameter set in the encoded data set, said at least one data reduction unit further configured to decide, on a block-by-block basis, whether to skip transmission of the target subset to the decoder according to the decoding consequence of skipping transmission of the target subset to the decoder.

16. A video encoding apparatus comprising:
  means for receiving a sequence of video frames, each frame comprising a plurality of non-overlapping rectangular blocks;
  means for encoding the sequence of video frames to generate an encoded video data set for each of the plurality of non-overlapping blocks included in one video frame, wherein the encoded video data set comprises a block encoding mode, a motion vector, a quantization parameter, and a set of frequency domain coefficients for each block;
  means for determining, on a block-by-block basis, a decoding consequence of skipping transmission to a decoder of a target subset of the encoded data set for each image block by analyzing a predicted recovery of the target subset by the decoder according to a plurality of alternative decoder recovery modes, wherein the target subset includes at least one block-level parameter set in the encoded data set; and
  means for deciding, on a block-by-block basis, whether to skip transmission of the target subset to the decoder according to the decoding consequence of skipping transmission of the target subset to the decoder.

17. A video encoding method comprising:
  encoding a plurality of non-overlapping rectangular blocks in a video frame to generate an encoded video data set for each image block;
  prioritizing data for transmission in subsets of regional blocks included in the frame, based on effects of region loss on system distortion; and
  determining, on a block-by-block basis, a decoding consequence of skipping transmission to a decoder of a target subset of the encoded data set for each image block by analyzing a predicted recovery of the target subset by the decoder according to a plurality of alternative decoder recovery modes.

18. A video decoding method comprising:
  receiving from a video encoder an encoded video data set for each image block of a plurality of non-overlapping rectangular blocks in a video frame, wherein the video data set comprises a block encoding mode, a motion vector, a quantization parameter, a set of frequency domain coefficients, and an indicator of skipped data;
  selecting a recovery mode of a plurality of alternative recovery modes, wherein a recovery mode is selected on a block-by-block basis;
  employing the video data set for each image block to recover a recovery data set for a respective video image block according to the recovery mode, the recovery data set including at least one block-level parameter set associated with the video data set; and
  generating a decoded sequence of video frames from the recovery data set and the video data set.

19. The method of claim 18, wherein the plurality of alternative recovery modes includes an interpolation mode.

20. The method of claim 19, wherein the interpolation mode is a spatial interpolation mode.

21. The method of claim 19, wherein the interpolation mode is a temporal interpolation mode.

22. The method of claim 18, wherein the plurality of alternative recovery modes includes at least one of a spatial interpolation mode and a temporal interpolation mode.

23. The method of claim 18, wherein the recovery data set includes the block encoding mode.

24. The method of claim 18, wherein the recovery data set includes the motion vector.

25. The method of claim 18, wherein the recovery data set includes the quantization parameter.

26. The method of claim 18, wherein the recovery data set includes a partial subset of the set of frequency domain coefficients.

27. The method of claim 26, wherein the partial subset of the set of frequency domain coefficients consists of a DC coefficient and a set of 5-lowest-frequency AC coefficients in zig-zag order.

28. The method of claim 18, further comprising receiving from the encoder an identifier of the recovery data set to be recovered.

29. The method of claim 18, further comprising receiving from the encoder an indicator of a selected recovery mode to be used by the decoder to recover the recovery data set.

30. The method of claim 18, further comprising receiving from the encoder a video data packet including a header and a video data payload, wherein the header includes an identifier of the recovery data set to be recovered.

31. The method of claim 18, wherein the recovery data set includes an entire video image block.

32. A video decoder comprising:
  an input buffer to receive encoded data as a sequence of input video data packets from an encoder;
  at least one data recovery unit configured to select a recovery mode from a plurality of recovery modes, employ a video data set encoding a the video sequence to recover a recovery data set according to the recovery mode, a recovery mode being selected on a block-by-block basis, the recovery data set including at least one block-level parameter set associated with the video data set; and
  decoding logic connected to the data recovery unit and configured to generate a decoded sequence of video frames from the recovery data set and the video data set;
  wherein a frame in the video sequence comprises a plurality of non-overlapping rectangular blocks including a video image block, and wherein the video data set comprises a block encoding mode, a motion vector, a quantization parameter, a set of frequency domain coefficients associated with the video image block, and an indicator of skipped data.

33. A video decoding apparatus comprising:
  means for receiving from a video encoder a video data set for each encoded block of a plurality of non-overlapping rectangular blocks included in a video frame, wherein each video data set comprises a block encoding mode, a motion vector, a quantization parameter, a set of frequency domain coefficients, and an indicator of skipped data;
  means for selecting a recovery mode of a plurality of alternative recovery modes, a recovery mode being selected on a block-by-block basis;
  means for employing the video data set to recover a recovery data set for a video image block according to the recovery mode, the recovery data set including at least one block-level parameter set associated with the video data set; and
  means for generating a decoded sequence of video frames from the recovery data set and the video data set.

* * * * *